United States Patent [19]

Deville

[11] Patent Number: 4,508,100
[45] Date of Patent: Apr. 2, 1985

[54] METHOD FOR ENAMELING THE BOTTOM FACE OF A CULINARY VESSEL OF ALUMINUM OR ALUMINUM ALLOY AND A CULINARY VESSEL OBTAINED IN ACCORDANCE WITH SAID METHOD

[75] Inventor: Jean-Pierre Deville, La Balme de Sillingy, France

[73] Assignee: Seb S.A., Selongey, France

[21] Appl. No.: 502,952

[22] Filed: Jun. 10, 1983

[30] Foreign Application Priority Data

Apr. 15, 1983 [FR] France ................................ 83 06178

[51] Int. Cl.³ .............................................. A47J 27/00
[52] U.S. Cl. .................... 126/390; 427/419.4
[58] Field of Search ...................... 126/390; 427/419.4, 427/376.4, 376.3, 380

[56] References Cited

U.S. PATENT DOCUMENTS

| 2,071,765 | 2/1937 | Rodman | 427/419.4 X |
| 2,768,907 | 10/1956 | Lusoy | 427/419.4 X |
| 2,864,721 | 12/1958 | King et al. | 427/419.4 X |
| 2,932,585 | 4/1960 | Hubbell et al. | 427/491.4 X |
| 3,593,702 | 7/1971 | Zigomalas | 126/390 |
| 3,627,560 | 12/1971 | Morgan | 427/419.4 X |
| 3,788,513 | 1/1974 | Racz | 126/390 X |

FOREIGN PATENT DOCUMENTS 51-20211 2/1976 Japan .................................. 427/419.4

*Primary Examiner*—Randall L. Green
*Attorney, Agent, or Firm*—Young & Thompson

[57] ABSTRACT

A first coating of enamel slip of a conventional type for aluminum is applied on the bottom face of a culinary vessel of aluminum or aluminum alloy, then heated in order to produce partial evaporation of water from the coating. Without allowing coating to cool, a second coating of abrasion-resistant enamel is applied on the first coating and reheated in order to produce complete evaporation of the volatile components. The two coatings are then immediately fired in order to sinter the enamels.

3 Claims, 2 Drawing Figures

METHOD FOR ENAMELING THE BOTTOM FACE OF A CULINARY VESSEL OF ALUMINUM OR ALUMINUM ALLOY AND A CULINARY VESSEL OBTAINED IN ACCORDANCE WITH SAID METHOD

This invention relates to a method for enameling the bottom of culinary vessels such as saucepans, frying pans, shallow frying pans and the like of aluminum or aluminum alloy.

Enamels of known types which are used for enameling aluminum or aluminum alloys suffer from the disadvantage of being soft or in other words of affording low resistance to abrasion and scoring. This disadvantage results from the particular composition of the enamel frit employed, the sintering temperature of which must necessarily be lower than the melting point of the aluminum or aluminum alloy employed.

Some attempt has been made to harden these enamels by adding hardening agents, as has already been described in French Pat. No. 2,289,627. However, the present Applicant has observed that the addition of such hardening agents is attended by a major drawback in that it has the effect of considerably reducing the adhesion of the enamel coating.

By reason of the disadvantages just mentioned, manufacturers usually adopt the solution which consists in forming an enamel coating only on the side wall of the utensil whereas the metal of the bottom face of this latter remains uncoated.

At the time of manufacture, it is easier to coat the entire external surface of the utensil with enamel, then to remove the enamel from the bottom of the utensil by etching.

Aside from the fact that the bottom of the utensil is consequently difficult to clean, the above-mentioned etching operation reduces the thickness of the metal of the bottom wall, with the result that it is necessary to employ for the manufacture of the utensil a greater thickness of metal than would otherwise be necessary in order to obtain sufficient mechanical strength. This has the effect of increasing the cost of manufacture.

The object of the present invention is to overcome the disadvantages mentioned above by providing a method for enameling the bottom of culinary vessels which is particularly economical to perform and makes it possible to obtain an enamel which adheres strongly to the bottom face and thus makes this latter easy to clean, said enamel being additionally characterized by excellent abrasion resistance.

In accordance with the invention, the method for enameling the bottom face of a culinary vessel of aluminum or aluminum alloy which consists in applying on said bottom face an enamel slip coating of a conventional type for aluminum or aluminum alloy is characterized by the following steps:
  a. said slip coating is heated in order to produce partial evaporation of water from said coating;
  b. without allowing said coating to cool, a second coating of enamel slip is applied on the first in order to afford abrasion resistance;
  c. said coating is heated in order to produce complete evaporation of the volatile components;
  d. said coatings are then immediately fired in order to sinter the enamels.

The practical application of this method is extremely rapid, in particular because it dispenses with any need for intermediate firing of the first enamel coating. Aside from the fact that this high speed of execution of the method achieves a considerable saving of time and energy, the aluminum or aluminum alloy is heated to the enamel firing temperature during a minimum period of time in the course of a single firing operation, with the result that its mechanical properties are not liable to be impaired by unduly long exposure at this temperature.

Furthermore, the present Applicant has found that surprising advantages are gained by applying the second coating of enamel on a first enamel layer which has not been fired but partially evaporated and still in the hot state. When adopting this procedure, the first enamel coating in the form of a hot and porous "biscuit" exhibits with respect to the second enamel coating absorbent properties such that the components of said second coating infiltrate into the first coating, with the result that exceptional adhesion between the two coatings is thus obtained.

The fact of applying the second enamel coating on a first coating of unfired enamel goes against all the habits acquired in the present state of the technique since it could be expected that, by proceeding in this manner, the first coating does not have sufficient mechanical cohesion to withstand the remaining operations.

Moreover, excellent adhesion is also obtained between the first enamel coating and the surface of the cooking vessel since the coating composition employed for this purpose is endowed with this property in a known manner.

It is also worthy of note that the method in accordance with the invention permits the use of a second enamel coating having a composition which is different from the first coating, thereby making it possible to obtain excellent resistance to abrasion and to scoring while at the same time adhering very strongly to the first coating as explained earlier whereas it would not offer sufficient adhesion to the surface of the culinary vessel if it were applied directly to this latter.

In an advantageous embodiment of the method, the first layer of enamel slip is heated to a temperature within the range of 50° to 95° C. during a sufficient period of time to reduce the moisture content to a value within the range of 0.5 to 10% by weight.

With a moisture content of such low value, the layer of particles of enamel frit appears in the form of a "biscuit" having a sufficient degree of mechanical cohesion for subsequent handling operations while having a high absorption capacity for the enamel slip which is applied subsequently.

Preferably, the second enamel coating is applied on the first enamel coating before the temperature of this latter has fallen to a value below about 45° C.

The fact of preventing complete cooling of the first coating permits a gain in energy during the subsequent operation of complete evaporation and improves the adhesion of the second enamel coating.

In a preferred embodiment of the invention, the second enamel coating is applied by screen-process deposition.

Experience has in fact shown that the cohesion of the first coating was wholly compatible with the application of a deposition screen on said coating.

According to a second aspect of the invention, the culinary vessel of aluminum or aluminum alloy having an enameled bottom wall and obtained by means of the method in accordance with the invention is essentially provided with two superposed coatings of enamel sintered at a temperature which is compatible with the melting point of the aluminum or aluminum alloy. The outer coating contains a suitable charge of hardening agents for making said coating resistant to abrasion and the inner coating contains a smaller charge of hardening agents in order to permit optimum adhesion between said inner coating and the bottom of the vessel.

The present Applicant has in fact found that, when the first enamel coating contained less than about 10% of hardening agents, the presence of these latter did not affect the adhesion of said first coating to the surface of the utensil.

On the other hand, the presence of such hardening agents in a proportion within the range of 15 to 40% by weight in the second coating endows this latter with very high abrasion resistance.

The enameled vessel produced by a method in accordance with the invention is thus economical to produce and very easy to clean.

Other features of the invention will be more apparent upon consideration of the following description and accompanying drawing, wherein.

Figure 1:
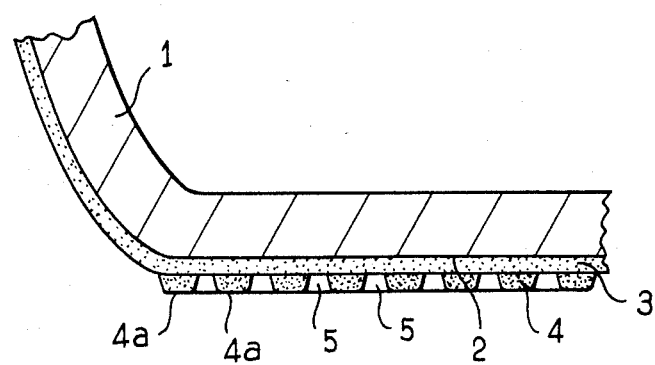
FIG. 1 is a fragmentary longitudinal sectional view showing the bottom wall of a culinary vessel produced by a method in accordance with the invention and coated with enamel.
Figure 2:
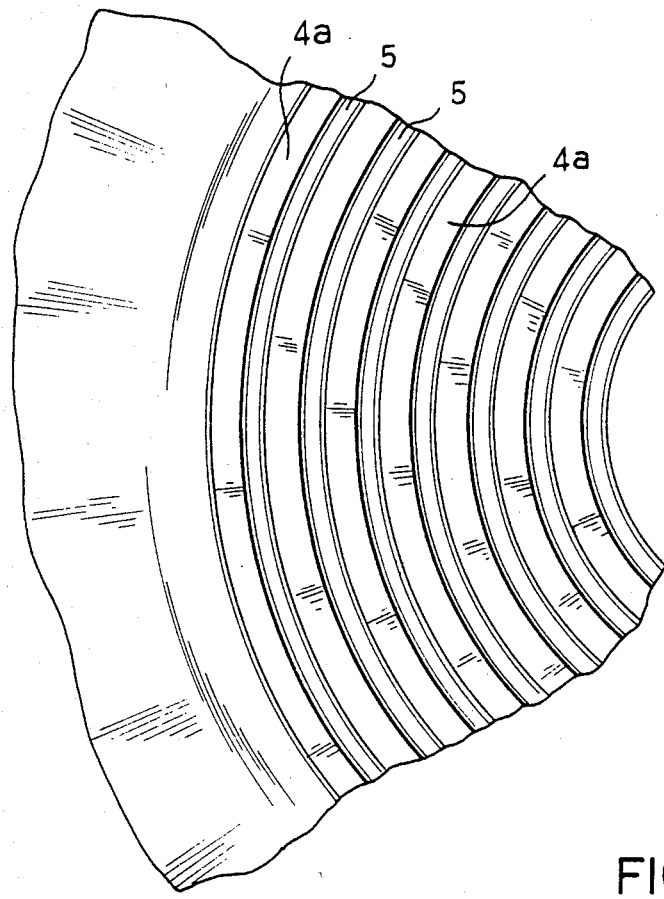
FIG. 2 is a fragmentary plan view of the bottom wall of the vessel.

In the embodiment shown in the figures, the culinary vessel 1 such as a frying pan of aluminum or aluminum alloy is provided on its bottom wall 2 with two superposed enamel layers or coatings 3, 4 obtained from an enamel frit which is sinterable at a temperature below the melting point of the aluminum or aluminum alloy.

In accordance with the invention, the outer coating 4 contains a suitable charge of hardening agents for endowing said coating with abrasion resistance. The inner coating 3 which is adjacent to the bottom wall 2 contains a smaller charge of hardening agents in order to permit optimum adhesion between said inner coating and the bottom vessel wall 2.

The enamel coatings 3 and 4 are obtained from an enamel frit of conventional type for aluminum or aluminum alloys, to which are added hardening agents such as α-alumina, silicon carbide, quartz, tungsten carbide, silico-aluminates or metals such as tungsten, titanium and stainless steel in the form of fine particles.

Experience has shown that excellent abrasion resistance was obtained when the outer coating 4 contains between 15 and 40% by weight of hardening agents.

The present Applicant has also observed that, in order to obtain excellent adhesion of the coating 3 to the bottom face 2 of the vessel, this coating material must contain less than 10% by weight of hardening agents.

In the example illustrated in the accompanying drawing, the outer enamel layer 4 which is hardened by the hardening agents is constituted by a series of concentric rings 4a which are raised with respect to the first layer 3, said rings being separated from each other by grooves 5.

The intended function of these projecting rings 4a is to reduce the contact surface between the bottom of the utensil and the heating surface or other work surface of a kitchen in order to limit the wear of the enamel layer 4 solely to said projecting rings.

Another function of the projecting rings 4a is to provide an attractive appearance.

Said projecting rings 4a can be replaced by spirals, a square mesh pattern, a checkerboard pattern, a raised-button pattern or inscriptions in relief.

The mode of operation involved in the application of the enamel coatings 3 and 4 on the bottom or underface 2 of the culinary vessel 1 will now be described by way of example without any limitation being implied.

A first step consists in compressed-air spraying on the underface 2 of the aluminum vessel a slip of enamel frit of a conventional type for aluminum, to which there have been added by way of example 10% of hardening agents such as fine particles of silicon carbide.

The coating of enamel-frit slip is then heated to a temperature within the range of 50° to 95° C. and preferably 70° C. during a sufficient period of time to ensure that the residual moisture content of said slip coating is within the range of 0.5 to 10% by weight.

The coating then consists of a "biscuit" having a sufficient degree of cohesion to guard against destruction during subsequent handling of the vessel.

Before the temperature of said "biscuit" has fallen below approximately 45° C., an enamel paste is applied by screen-process deposition on said "biscuit" while this latter is still in the hot state. The enamel paste contains a conventional enamel frit for aluminum, mineral pigments, pine oil as a liquid vehicle, alcohol, and so on. Hardening agents such as silicon carbide are added to said enamel paste in a proportion which is preferably equal to 20% by weight but this latter may vary between 15 and 40%.

In accordance with the screen deposition process, said paste is applied on a mask which serves to produce a relief pattern on the outer layer of enamel.

By virtue of the fact that the "biscuit" of enamel particles of the first coating has been practically reduced to a zero moisture content, the porosity of the biscuit is such as to enable it to absorb the enamel paste applied on it by screen-process deposition. By reason of the fact that said biscuit is still in the hot state at the moment of said application, the viscosity of the oil which serves as a vehicle for the screen-process paste decreases, with the result that said oil infiltrates into the pores of the biscuit and thus entrains particles of the screen-process enamel paste into said pores.

Perfect adhesion is thus obtained between the outer layer of enamel applied by screen process and the first layer which contains a relatively low proportion of hardening agents.

The coatings of enamel particles applied on the vessel are then reheated in order to achieve complete removal of the volatile components of said coatings.

The vessel is then introduced in a furnace in order to fire the coatings of enamel frit with a view to sintering these latter and converting them to enamel. The firing temperature is of the order of 560° C. in the example considered.

There is thus obtained a culinary vessel having a bottom face 2 coated with a first layer of enamel 3 which has a thickness of the order of 50 microns and which adheres strongly to the metal, and with a second layer of enamel 4 having a thickness of the order of 20 microns and high abrasion resistance by reason of the presence of a large quantity of hardening agents.

Said second layer of enamel 4 adheres strongly to the first layer 3 as a result of partial interpenetration of these two layers which is obtained by means of the method in accordance with the invention. This excellent adhesion of the two enamel layers 3 and 4 is demonstrated by subjecting the culinary vessel to repeated thermal shocks.

By way of example, the basic composition of the enamel frit employed for the layers or coatings 3 and 4 can be as follows: $B_2O_3$: 3 parts; KOH: 2 parts; ZnO: 10 parts; $SiO_2$: 6 parts; the remainder being constituted by the liquid vehicle.

The method described in the foregoing is particularly rapid and economical by virtue of the fact that it dispenses with the need for intermediate firing of the first enamel coating 3. As a consequence, the aluminum of the vessel is no longer subjected during an excessive length of time to a high temperature which would be liable to impair its mechanical properties and to produce deformation of the vessel, thus resulting in a poor thermal contact between the bottom of said vessel and the heating surface.

Another appreciable feature is that enameling of the underface 2 of the vessel makes it unnecessary to perform conventional etching of said underface, with the result that the thickness of metal of the bottom wall is unaffected.

It is thus possible to produce a culinary vessel such that the thickness of metal of the entire vessel can be smaller than the thickness which is customarily adopted, thereby reducing the cost of manufacture.

The invention is clearly not limited to the example which has just been described and many modifications may accordingly be contemplated without thereby departing from the scope or the spirit of the invention.

Thus the second enamel coating 4 can be applied on the first coating 3 by a method other than the screen process. Said second coating 4 can in fact be applied by compressed-air spraying in the same manner as the first coating, by decalcomania or by spray-gun projection through a mask or the like.

As can readily be understood, the first enamel coating 3 can cover the entire external and internal surface of the vessel.

It is apparent from the foregoing description that the invention applies to any enamel composition for aluminum parts, such compositions being well-known in the technique and characterized by a sintering temperature below approximately 600° C.

What is claimed is:

1. A method for enameling the bottom face of a culinary vessel of aluminum or aluminum alloy which comprises applying on said bottom face an enamel slip coating of a conventional type for aluminum or aluminum alloy, heating said layer of enamel slip to a temperature within the range of 50° to 95° C. during a sufficient period of time to reduce the moisture content to a value within the range of 0.5 to 10% by weight, applying a second layer of enamel slip containing between 15 to 40% by weight of hardening agents in the form of fine particles on the first layer of enamel slip before the temperature of said first layer has fallen to a value below about 45° C., and firing said two layers in order to sinter the enamels contained in said layers.

2. A method according to claim 1, and applying the second enamel layer by screen-process deposition.

3. A method according to claim 1, wherein the first enamel layer contains less than 10% by weight of hardening agents.

* * * * *